(12) United States Patent
Calvo et al.

(10) Patent No.: US 6,767,161 B1
(45) Date of Patent: Jul. 27, 2004

(54) HIGHWAY ELECTRIC POWER GENERATOR

(76) Inventors: Rafael A. Calvo, 145 Hurlbut St. Apt 107, Pasadena, CA (US) 91105; Janet Ellis Calvo, 145 Hurlbut St. Apt 107, Pasadena, CA (US) 91105

( * ) Notice: Subject to any disclaimer, the term of this patent is extended or adjusted under 35 U.S.C. 154(b) by 0 days.

(21) Appl. No.: 10/310,622

(22) Filed: Dec. 5, 2002

Related U.S. Application Data

(60) Provisional application No. 60/335,724, filed on Dec. 5, 2001.

(51) Int. Cl.[7] ................................................ F03G 7/00
(52) U.S. Cl. .......................................... 404/71; 290/1 R
(58) Field of Search ............................ 404/71; 290/1 R, 290/45; 60/721

(56) References Cited

U.S. PATENT DOCUMENTS

| | | | | | |
|---|---|---|---|---|---|
| 1,916,873 | A | * | 7/1933 | Wiggins ....................... | 185/39 |
| 3,885,163 | A | * | 5/1975 | Toberman ..................... | 290/1 R |
| 4,238,687 | A | | 12/1980 | Martinez ...................... | 290/1 R |
| 4,239,974 | A | * | 12/1980 | Swander et al. ............. | 290/1 R |
| 4,239,975 | A | * | 12/1980 | Chiappetti ................... | 290/1 R |
| 4,247,785 | A | * | 1/1981 | Apgar .......................... | 290/1 R |
| 4,409,489 | A | * | 10/1983 | Hayes ........................... | 290/1 R |
| 4,418,542 | A | | 12/1983 | Ferrell .......................... | 60/668 |
| 4,434,374 | A | | 2/1984 | Lundgren ..................... | 290/1 R |
| 4,614,875 | A | * | 9/1986 | McGee ......................... | 290/1 R |
| 4,739,179 | A | | 4/1988 | Stites ........................... | 290/1 R |
| 4,980,572 | A | * | 12/1990 | Sen .............................. | 290/1 R |
| 5,355,674 | A | * | 10/1994 | Rosenberg ................... | 60/325 |
| 6,091,159 | A | * | 7/2000 | Galich .......................... | 290/1 R |
| 6,172,426 | B1 | * | 1/2001 | Galich .......................... | 290/1 R |
| 6,204,568 | B1 | * | 3/2001 | Runner ........................ | 290/1 R |
| 6,353,270 | B1 | * | 3/2002 | Sen .............................. | 290/1 R |
| 6,362,534 | B1 | * | 3/2002 | Kaufman ..................... | 290/1 R |
| 6,376,925 | B1 | * | 4/2002 | Galich .......................... | 290/1 R |
| 6,494,144 | B1 | * | 12/2002 | Perez Sanchez ............ | 104/287 |

FOREIGN PATENT DOCUMENTS

| | | | |
|---|---|---|---|
| DE | 24 30 800 | * | 1/1976 |
| JP | 5-22899 | * | 1/1993 |
| JP | 10-73073 | * | 3/1998 |
| JP | 11-141456 | * | 5/1999 |

* cited by examiner

*Primary Examiner*—Gary Hartmann

(57) ABSTRACT

A system embedded in a road surface generates power from the passage of motor vehicles. It activates only when vehicles with axles overpass it in the prescribed direction. The power generating device includes a grill and actuating arms, actuating buttons, and a vehicle sensing device for ensuring the system does not activate when motorcycles pass over it. The actuating arms are connected to shafts and gears for transferring vehicular movement into rotational energy to a turbine placed at the side of the road. A speed brake, flywheel and transmission regulate the rotation speed of the generator motor for optimal production of electricity.

15 Claims, 7 Drawing Sheets

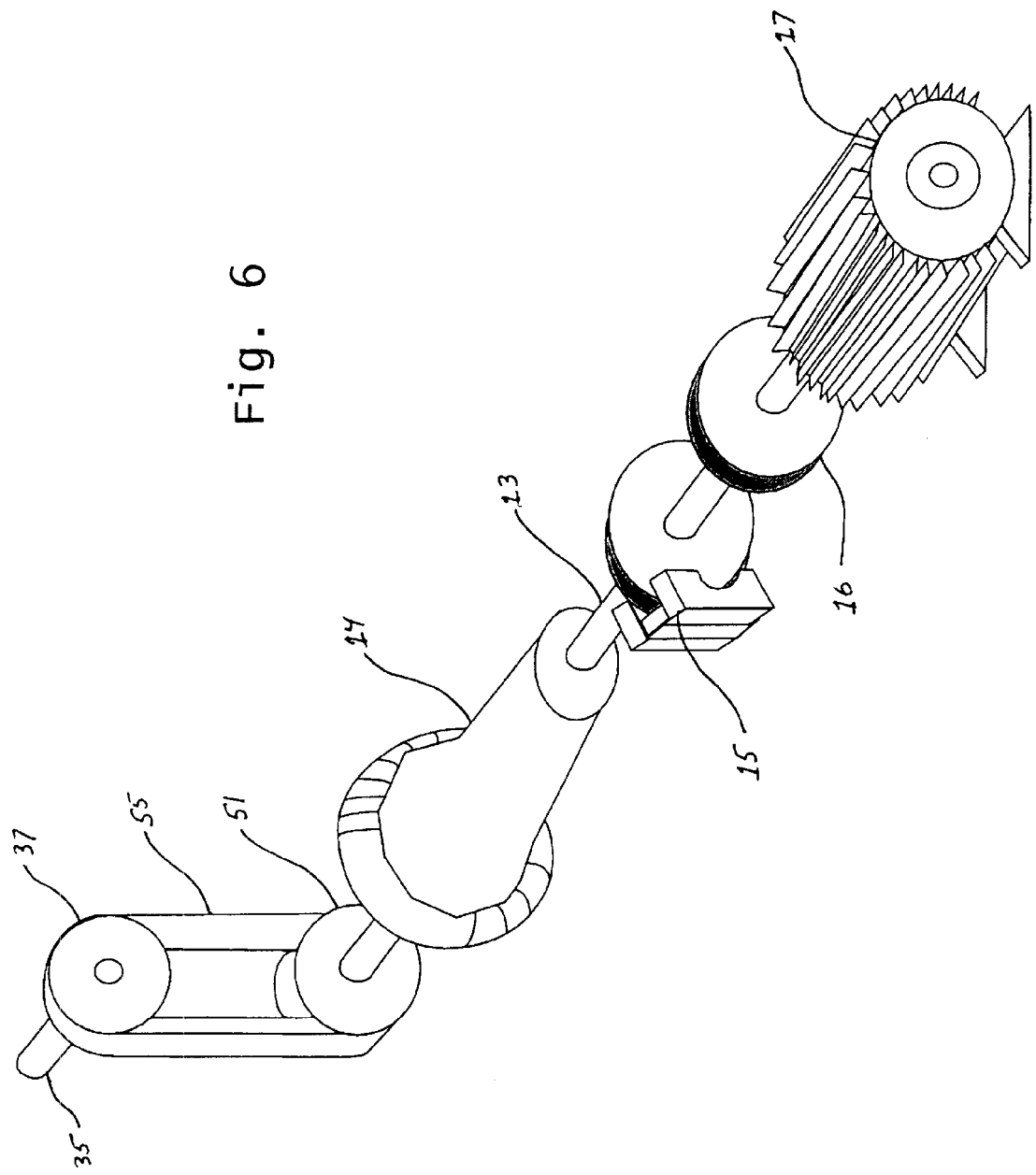

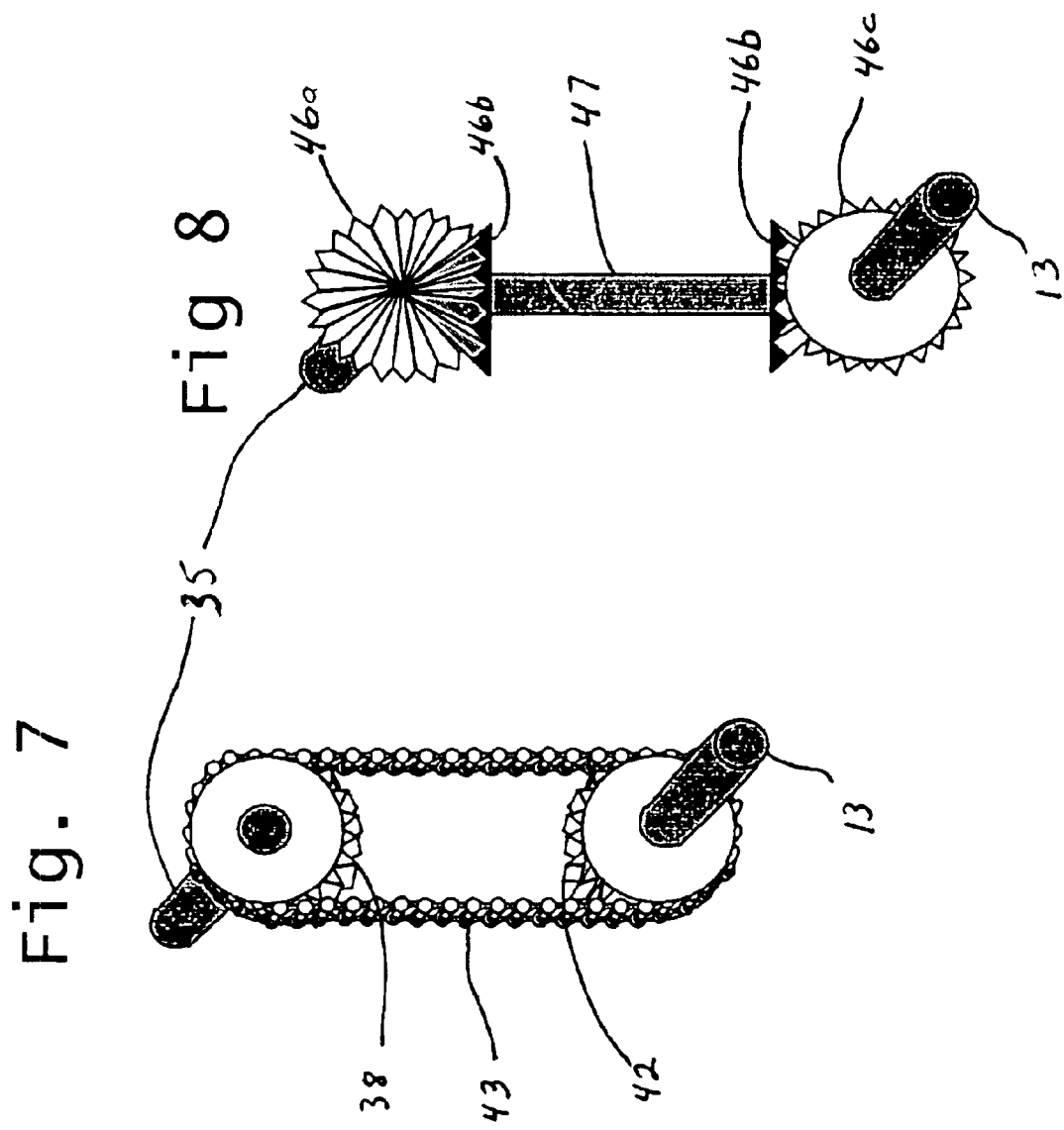

HIGHWAY ELECTRIC POWER GENERATOR

RELATED U.S. APPLICATION DATA

Provisional application No. 60/335,724, filed on Dec. 5, 2001.

BACKGROUND TO THE INVENTION

The interest in generating electricity from the flow of moving vehicles has existed for many decades. However, designing a device that provides a safe, efficient and comfortable means to convert the energy from moving vehicles to electricity has been elusive. The Highway Electric Power Generator offers a design that is unobtrusive to the motoring public, is efficient at converting the energy of moving vehicles to electricity, incorporates safety features for motorcycles, and does not result in a lack of control or comfort to those travelling over it.

Of the various common methods of generating electricity, much attention has been given to renewable sources of power. These include solar, wind and hydroelectric power to name a few. Solar power generation only works during the day and may be further affected by bad weather. Wind turbines require steady breezes to function and the size of the towers and blades can be problematic to the environment and costly to build. Hydroelectric plants must be built where enough water flows year round. Economies of scale usually demand large-scale construction to be effective and alters the environment by damming rivers.

The Highway Electric Power Generator provides a means to produce power 24 hours a day. It can be built to provide small amounts of power for special needs, or multiple units can be linked to produce greater quantities of power. For many years, our highways have served well for providing a means to travel from one place to another. Our roads have millions of vehicles travelling over them, and the energy from these moving vehicles can be effectively harnessed for producing electricity. Highways can be seen as rivers of metal, rubber and plastic whose flowing energy can be tapped for other purposes than to just move people, products or materials.

Devising a safe, simple and effective means to convert the energy of passing vehicles into electricity would assist in reducing the need for other electricity producing means while providing a cheap and useful source of electricity.

Other inventions have attempted to harness the energy of moving vehicles using treadle plates, pneumatic devices and complicated gearing mechanisms. Although these inventions capture some of the energy from passing vehicles and convert it into electricity, they all suffer from at least one of the following faults.

1) Some of the previous inventions stand in their ready state of operation as an obstacle protruding in the roadway. This is true for those devices using treadle plates. As motorists are generally accustomed to travelling on smooth roads, obstacles in the roadway would cause a driver to react instinctively by swerving or otherwise trying to avoid running over them. U.S. Pat. No. 4,238,687 is a prime example of such an obstacle.
2) In other previous inventions, the apparatus for contacting the vehicles as they pass are initially flush with the road surface but then give slightly, are depressed below the road level, or drop slightly in order to trigger a mechanism. This disruption to the vehicle would naturally lead to a sense of loss of control, unresponsive steering, poor road feel and an uncomfortable ride. U.S. Pat. Nos. 4,418,542 and 4,434,374 depict mechanisms where vehicles will drop down as they pass over the devices.
3) Some of the previous inventions do not consider the variety of vehicles on the road ranging from light trailers to motorcycles to large 80,000 lbs. trucks. In the case of the inventions using treadle plates some motorcycles or trailers could end up on either side of the plate causing difficulty in balance or control. U.S. Pat. Nos. 4,238,687 and 4,739,179 depict plates that protrude and drop potentially allowing a vehicle to straddle the plates with one axle (or wheel) on one side of the plate and the other axle or wheel on the other side of the plate. Motorcyclists may find these plates particularly difficult to traverse.
4) Some of the inventions do not consider other issues such as the need to back up over the devices or, in case of road repair, the need to divert traffic in the opposite direction from the normally prescribed flow of traffic.

SUMMARY OF THE INVENTION

All the foregoing faults can be overcome through the design of an energy capturing mechanism that is safe, simple and effectively transfers moving vehicle energy to a power generator. The mechanism includes at least one actuator button and one cocking arm that raises actuator arms through a grill in the roadway moments before a vehicle passes over the grill. The actuator arms are then depressed back under the road surface by the vehicle as it passes. These actuator arms are connected to a shaft that turns only in one direction and that shaft is connected to another shaft by a power transferring means. The second shaft may be directly connected to a turbine. In another embodiment a rotation regulating device (gearbox), speed brake and flywheel may be added to regulate the speed of a turbine. The invention's design allows for singular connections between actuator arms and turbine shafts, or multiple actuator arms may be connected to a single turbine shaft.

Beginning at the top (or at road surface level), few parts of the invention are visible to motorists. Motorists will encounter the vehicle sensing device. This device includes a long narrow apparatus (henceforth referred to as the "triggering bars") placed in a transverse manner across a portion of a lane of travel just barely above the road surface; a row of actuator buttons also placed in a transverse manner beyond the triggering bars; and past the buttons, a metal grill resembling a storm drain.

When depressed by a passing tire, the trigger bars displace a locking bar which in turn shifts the locking flap in a cocking arm below ground. In order for the device to activate, both trigger bars must be depressed at the same time. Furthermore electromagnetic sensor rings situated between the triggering bars, and embedded in the roadway, must acknowledge the mass of a vehicle passing over it and activate a locking mechanism. Therefore, even if two motorcycles engage the vehicle sensing device at the same time, the device will still not activate because the sensor did not register a vehicle passing over at the same time. The vehicle sensing device interacts with the cocking arms situated below the road surface to regulate activity between the actuator buttons and the actuator arms. The sensing device may include multiple rings that can also determine the direction of passing vehicles. With this capacity, the sensor may restrict the device from operating when vehicles are travelling in directions not prescribed for normal traffic flow. This may be true in circumstances requiring road repair, or for emergency vehicles traversing busy traffic areas. In one embodiment, multiple sensors may be substituted for the triggering bar mechanism.

The actuator buttons are circular and convex in shape, can be made of metal, ceramic, rubber or plastic, and will easily recede to the road level when depressed by passing vehicles. These buttons will appear similar to highway lane markers in use today. Each grill is about three to four feet wide and two to three feet long. In the preferred embodiment, these grills will be placed in a staggered arrangement, two in each lane of travel. The grill is placed level with the road surface and finished with a material or texture to approximate the road surface upon which it is placed.

Through the grill, actuator arms are raised and depressed by passing vehicles. The actuator buttons sit on small piston-like arms. When depressed, the buttons will cock the actuator arms up through the grill only moments before a vehicle passes over the grill, thus the driver of a vehicle passing over the grill will not see the actuator arm elevated. Further, the actuator arms operating through the grill never support the weight of the vehicles passing over them. The entire weight of the vehicle is borne by the grill. Therefore, vehicles passing over the device never experience any instability, loss of control or discomfort. After the vehicle has passed over the grill, the device will be left flat on the road surface and it will remain non-obstructive in appearance until the next vehicle comes along.

When these grills are placed in a staggered arrangement in the highway, an average car would activate the generating system four times and thus produce an efficient transfer of energy to the generator. By staggering the grills, at least three tires remain in contact with the normal surface and only one is in contact with the grill at any given moment. Furthermore, each tire will only trigger the actuator buttons and arms that are directly in front of the tire as it passes over the grill. By limiting the movement of actuators to only those actuators that are directly in the tires' paths, energy is not wasted on other moving parts. In the case of large multi-axle vehicles, the mechanism allows for a tire to be simultaneously on the actuator button an on the actuator arm without breaking the device.

The actuator arms require very little pressure to depress them after being cocked. A ratchet means at one end of each actuator arm is connected to a perpendicular shaft running the width of the grill. The shaft will turn easily only in a clockwise direction when an actuator arm is depressed. At the end of the shaft, a power transferring means transfers that rotation of the actuator shaft to a turbine shaft onto which may be connected a flywheel, a gearbox, a speed brake, and a turbine for generating power.

The impact force of a vehicle's tires against the actuator arms is affected by two factors. First, the weight borne by each tire traversing the grills will vary by the numerous types of vehicles in use today. Secondly, the speed of oncoming vehicles will also have an effect of impact force. A further consideration is to minimize the impact on the inertia of the passing vehicle. The ideal embodiment of the invention will place the device on downward sloping roadways including highway off-ramps, taking advantage of gravitational forces acting on vehicles passing over the device. The two factors just stated and the additional gravitational forces provide ample energy to efficiently turn the generating means without significantly reducing a vehicle's momentum.

Furthermore, another consideration of vehicular flow involves the density of traffic flow. The inverse relationship between traffic density and speed results in more frequent impacts with lessor force on the actuator arm when the traffic flow is heavy; and less frequent impacts with more force when the flow is light. This activity will result in the turbine generator spinning at appropriate levels in either situation.

Various embodiments of the invention permit multiple actuator shafts to be connected to a single turbine shaft. The turbine shaft consists of a power transferring means (which may double as a flywheel) for capturing the rotational energy of the actuator shaft(s). The turbine shaft then enters a gearbox designed to optimize output shaft speeds and disengage the output shaft by means of a clutch should vehicular activity be insufficient to effectively generate power.

Within the gearbox, a means of measuring input shaft speeds will keep the output shaft to the turbine spinning at optimal levels and will activate the speed brake if speeds exceed optimal power generating rpm's. The gearbox may also include a clutch for regulating output shaft speeds. This clutch may include a torque converter requiring a minimum input shaft speed before engaging the output shaft to the turbine. Somewhere along the output shaft yet before the turbine, a flywheel may be situated to encourage steady rotation of the output shaft.

The original design of the invention at the time the provisional application was filed included the opportunity for two wheeled vehicles to pass between the device or to ride over it with minimal disruption. To further regulate when the invention activates, within the last year a more effective means for safeguarding two wheeled vehicles passage over the invention has been developed. These safety features allow motorcycles to traverse the entire mechanism without activating the device.

Power generated from the Highway Electric Power Generator has various applications. The power generated may operate lights or other electrical devices directly, resulting in an independent electrical system. The power may be used to charge batteries; or, the power may be sold for public use through the electricity grid. The aforementioned invention should be placed in areas where adequate traffic flow occurs and where ice does not occur. The device will function in rainy conditions as drainage channels below the device will remove water as it filters through the actuator buttons and the actuator grill.

DESCRIPTION OF THE DRAWINGS

This invention may be more clearly understood with the following detailed description and by reference to the drawings in which:

FIG. 5 shows electric actuators connected to the sensor rings for securing the locking bars in place.

FIG. 6 is a perspective view of the turbine shaft with the connecting gears from multiple actuator gears and multiple shafts, the flywheel, gearbox, speed brake, generating turbine. The drawing includes a belt driven design for the power transferring means that transfers energy from the actuator shaft to the turbine shaft.

FIG. 7 is a perspective view of an optional power transferring means for connecting the actuator shaft to the turbine shaft using a chain means. When using a chain means, multiple actuator shafts may be connected to a single turbine shaft by placing multiple gears on a single turbine shaft.

FIG. 8 is a perspective view of another optional power transferring means that transfers the rotation of the actuator shaft to the turbine shaft by means of another shaft with crown gears. One embodiment of the power transferring means has one to one gear ratios between the shafts. Other gear ratios may be substituted or reduction gears added.

DETAILED DESCRIPTION OF THE INVENTION

Figure 1:
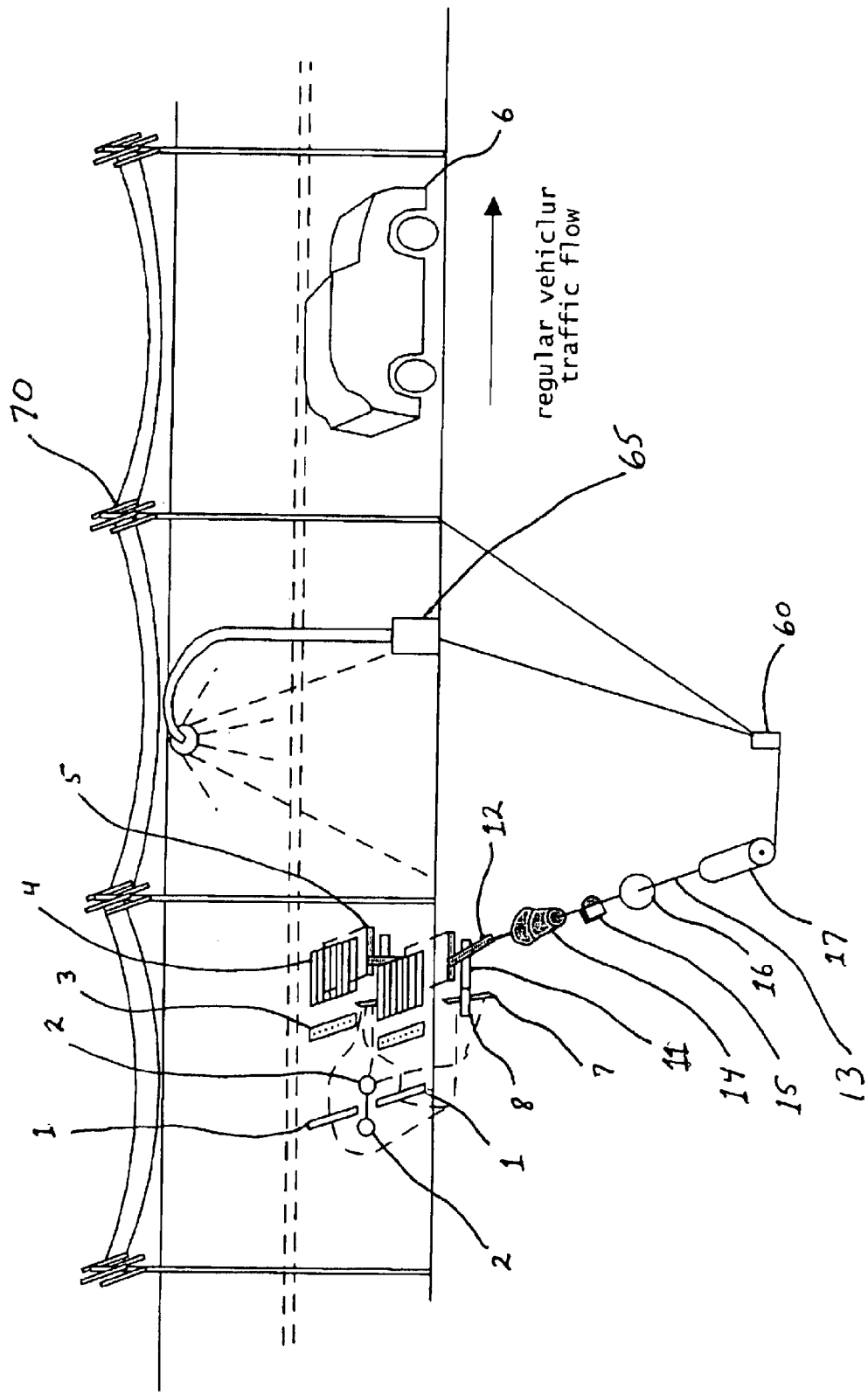
FIG. 1 is a schematic depiction of the invention in its totality. The drawing depicts the invention in a single lane of travel and includes the vehicle sensing device, the actuator buttons and the grill at the road's surface. Below the road level are found the actuator arms, cocking arms, power transferring means for transferring energy to the turbine shaft, the turbine shaft with a gear box, speed brake and flywheel attached, a battery for storing power and the connections to free standing power uses and/or to the power grid.
Figure 2:
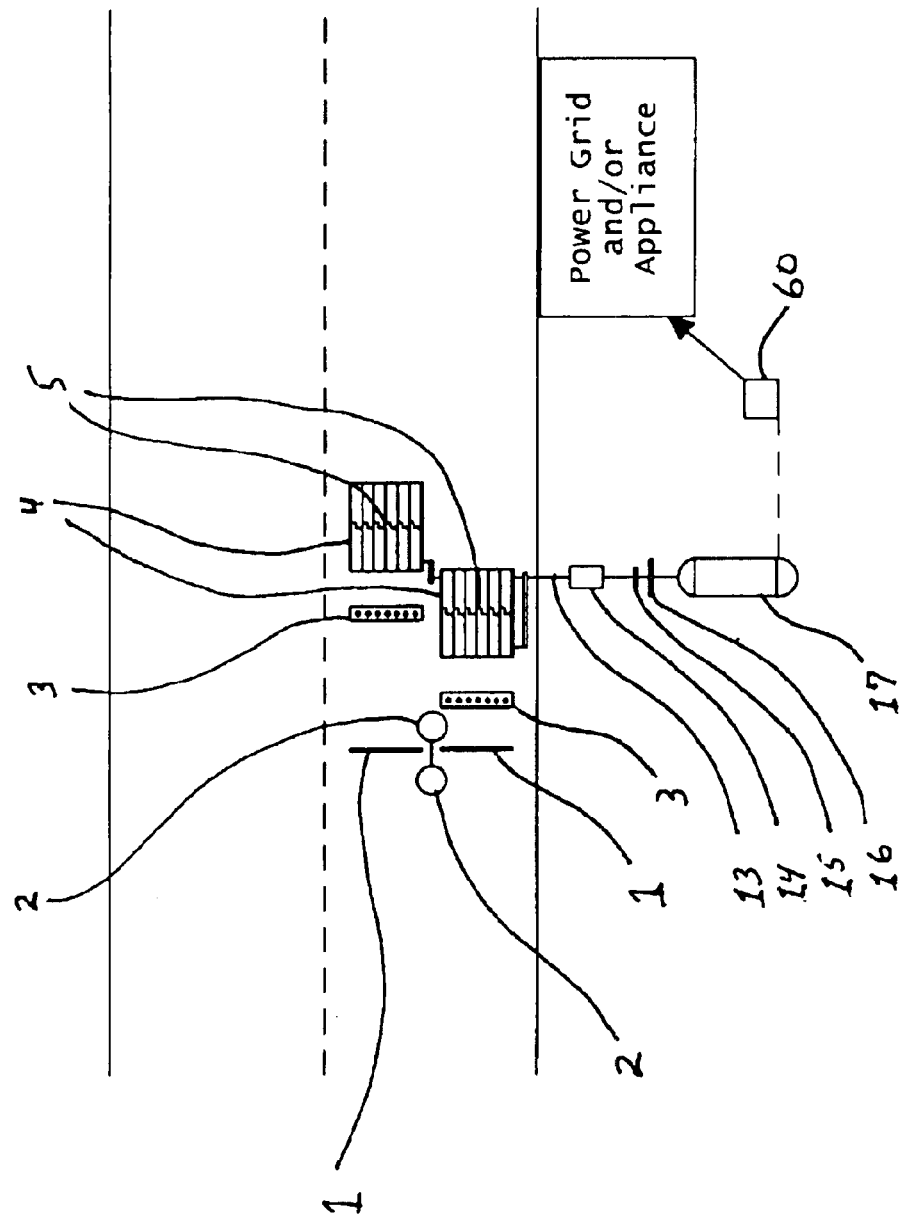
FIG. 2 is a top view of a preferred embodiment including two grills in a lane placed in a staggered fashion, but close enough to each other to connect them to a common turbine shaft. The actuator buttons and the vehicle sensing device are also visible. Two electromagnetic sensing rings are also disclosed.
Figure 3:
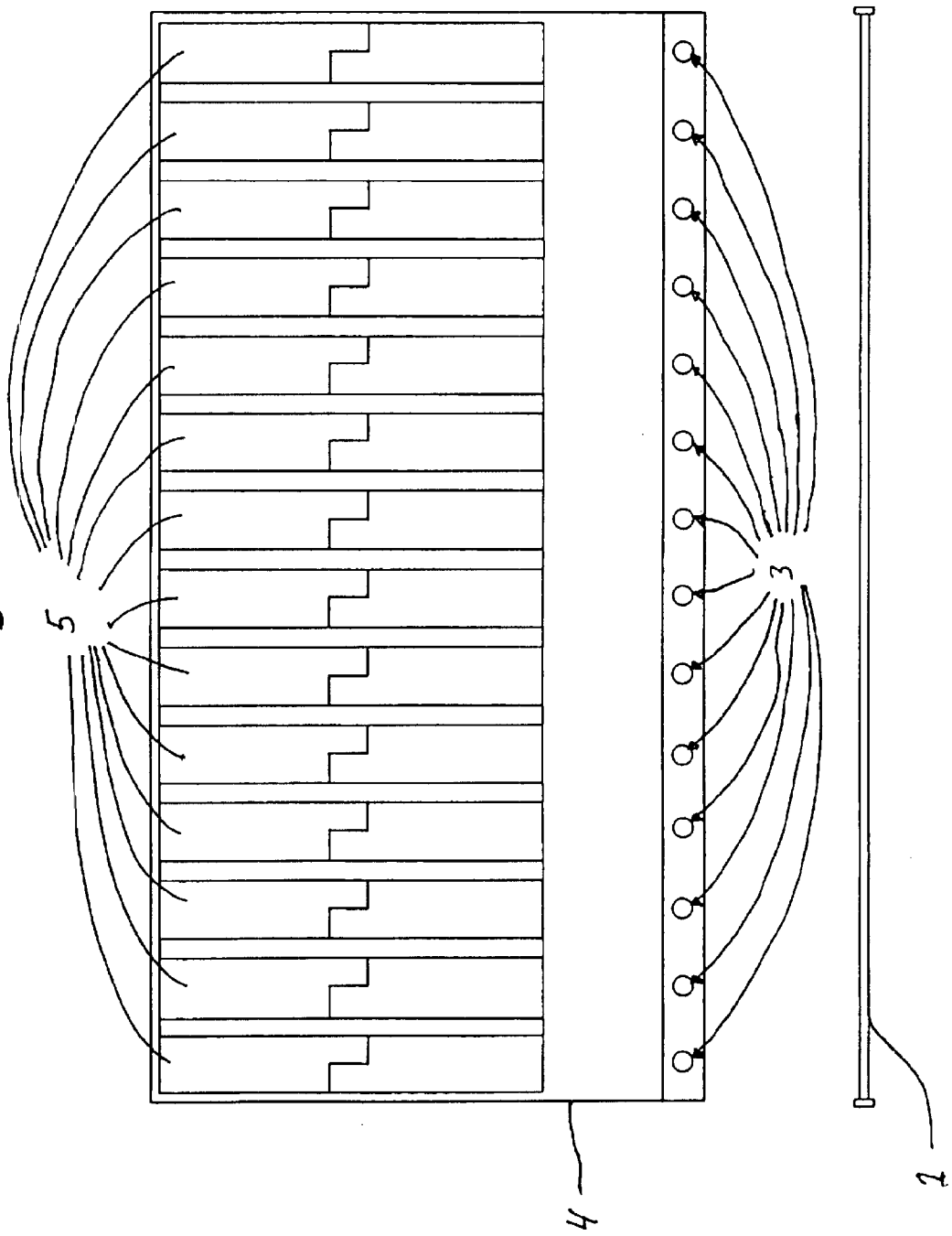
FIG. 3 is a top view of one grill with the vehicle sensing device trigger bar, the actuator buttons and the actuator arms. The drawing shows a plurality of actuator arms that may be included into one grill.
Figure 4:
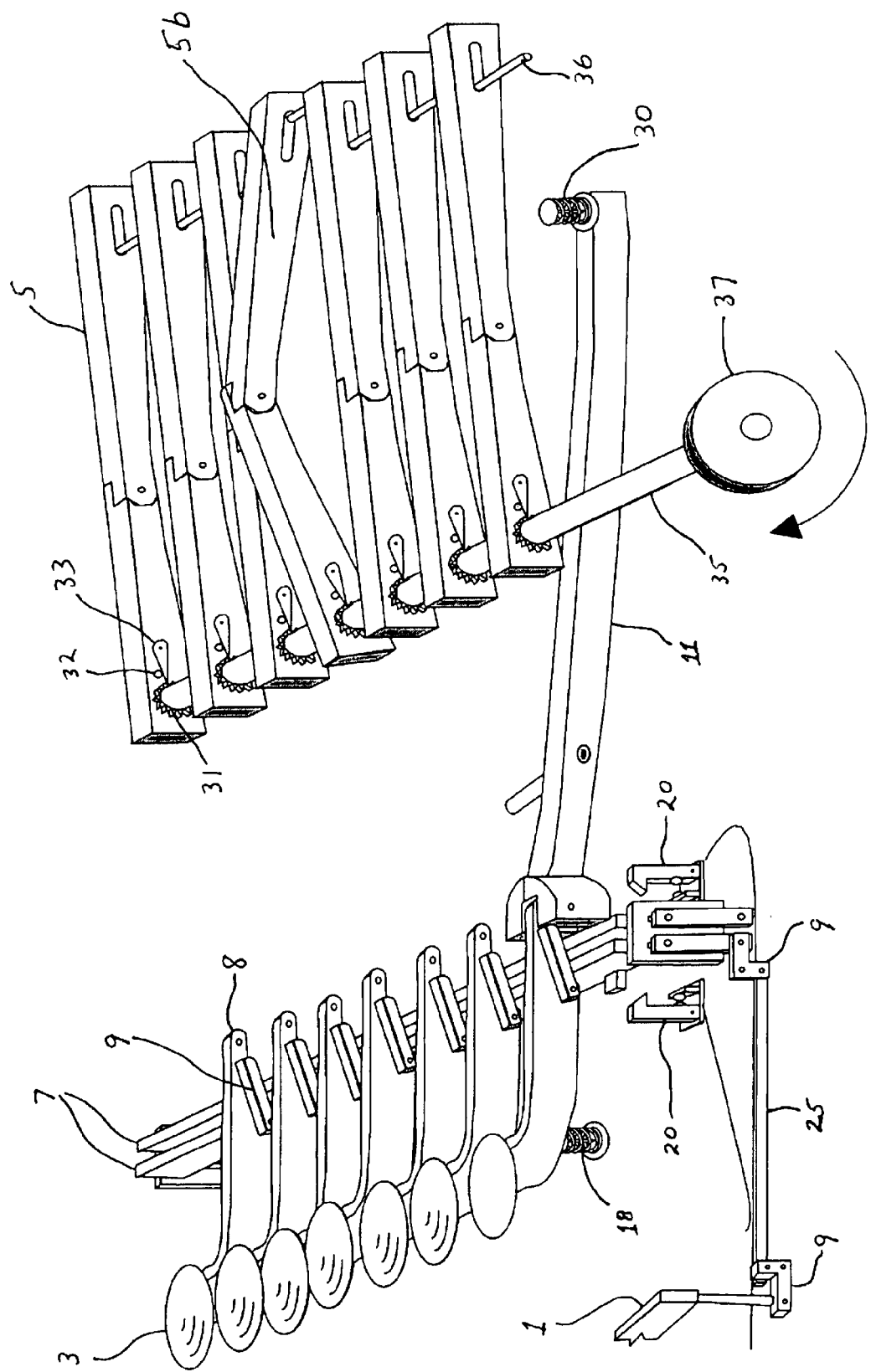
FIG. 4 is a detailed perspective view of the vehicle sensing device, the actuator buttons, the means for cocking the actuator arms, the actuator arms (with the fourth arm from the left raised), the ratchet means, and the actuator shaft with gear attached.
Figure 5:
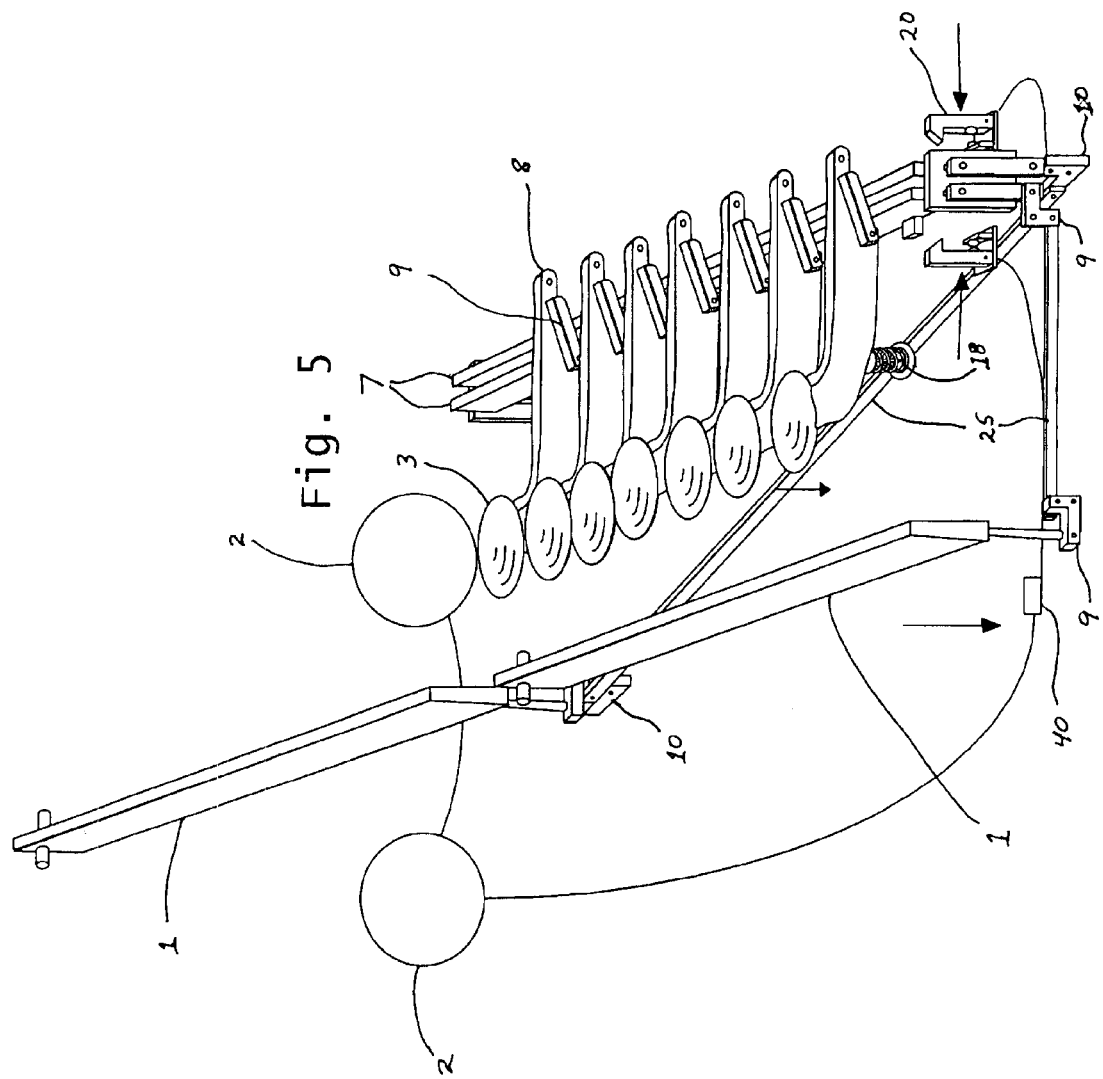
FIG. 5 is a detailed perspective view of one embodiment of the vehicle sensing device. In this drawing a mechanical connection has been established between the triggering bar and the locking bars for locking the cocking arms. The connection between the trigger bars at road level and the locking bars could also be effected with electric actuators.

Now referring to FIGS. 1, 2 and 5, a grill 4 of this invention is shown embedded in a roadway such that normal traffic flow of passing vehicles approach from the side where the vehicles will first engage the vehicle sensing device. The linear motion of the vehicles is captured by any one of several actuator arms 5 and converted into rotational motion and will be discussed in greater detail later. One embodiment of the vehicle sensing device includes a triggering bar 1 made of a suitable metal material placed in front of the actuator buttons 3. As a vehicle 6 passes over it, the bars are depressed and a mechanical connection transfers the motion to the cocking bars 7 below the cocking arms 8. Another embodiment uses flexible tubes in place of the triggering bar 1 and an electric actuator to depress the cocking arm lock bars 7. A pressure change in the tubes activates an electric actuator in place of linkages 9 and 10 of FIG. 5. Sensor rings 2 lie between triggering bars 1 with one in front of them and the other behind them. These rings detect vehicular direction and activate a locking mechanism 20 visible in FIG. 5 when a vehicle passes over the rings. FIG. 5 also shows electric relay 40. This relay registers the signal from sensor rings 2 and activates the locking apparatus 20 when triggered. With a short delay built into it, it will also terminate the signal to locking apparatus 20 thereby resetting the entire mechanism back to its ready state. When cocking arms 8 are locked, an actuator arm in grill 4 will be raised up by the cocking arm extension 11. Power transferring means 12 transfers the energy from passing vehicles to the turbine shaft 13 below road level. To turbine shaft 13 is connected a gearbox 14, speed brake 15, flywheel 16 and generator 17. Gearbox 14 may include a torque converter or a clutch mechanism as used in windmill generators to engage the generator appropriately. FIG. 3 is a top view of the invention including a trigger bar 1, the actuator buttons 3, the grill 4 and the actuator arms 5. In this embodiment, the buttons 3, the grill 4 and actuator arms 5 are parts of one unit rather than separate items in the roadbed. FIG. 4 is a perspective view of some of the actuator buttons 3, the partial view of the vehicle sensing device 1, linkage rods 25, hinges 24 with locking apparatus 20 below cocking arms locking bars 7. In order for the cocking arms 8 to lock, trigger bars must be depressed and the sensor rings 2 must activate. The electromagnetic ring sensors placed in the middle of a lane will trigger only when a vehicle passes over them in the correct direction. FIG. 4 discloses actuator buttons 3, cocking arm means 8 with locking flap 9 and return spring 18, cocking arm extension 11, recoiling spring 30, actuator arms 5, and one actuator arm 5b in the raised position. Spring 30 at the end of the cocking arm extension means 11 will recoil in the event that a multiple axle vehicle is simultaneously over actuator buttons 3 and the actuator arms 5. The vehicle sensing device including locking bars 7 and locking apparatus 20 below cocking arms 8 is shown in the released position. Situated near one end of actuator arms 5 is a ratchet means including ratchet teeth 31, ratchet lever 33, and lever stop 32. Ratchet teeth 31 are welded or otherwise securely attached to actuator shaft 35. The ratchet means permits unfettered raising of actuator arms 5 yet actuator shaft 35 only rotates clockwise because of stop 32. The ratchet configuration of this invention permits the free spinning of actuator shaft 35 against the other actuator arms 5 when those arms have not been raised. Actuator arms 5 are limited in how far they may rise by restricting rod 36. As seen in FIGS. 4 and 6, a gear wheel 37 is attached onto the end of the actuator shaft 35 for transferring the rotation energy of actuator shaft 35 to turbine shaft 13. One embodiment of the power transferring means shown in FIG. 7 depicts a chain drive mechanism including an actuator shaft gear 38 with teeth, a turbine shaft gear with teeth 42 and a chain 43. By using a chain drive, numerous turbine shaft gears 42 may be placed along a single turbine shaft 13. Furthermore, different size actuator shaft gears 35 and turbine shaft gears 42 would result in alternative turning ratios between the shafts. Additional reduction gears (not shown) may also be added to achieve optimal turbine shaft rotation speeds. FIG. 8 shows an alternative embodiment using crown gears 46a, a connecting shaft 47 and a turbine shaft crown gear 46c. Now referring to FIG. 6, turbine shaft 13 includes devices attached to it. Turbine shaft 13 may in its simplest embodiment directly connect to a turbine 17. Otherwise a flywheel 16, gearbox 14, and/or speed brake 15 may be used to regulate and optimize the spinning of the turbine. Turbine 17 shown in FIG. 6 may be connected to a battery 60, an electrical device 65, or to the power grid 70. The electricity generated thus has several applications that may be used in conjunction with each other or specifically as the individual needs of the end user dictate.

The above-described embodiments of the present invention are merely descriptive of its principles and are not to be considered limiting. This application is intended to cover any modifications or changes as may come within the scope of the following claims.

We claim:
1. An apparatus for generating power from the passage of a vehicle over a roadway comprising:
    at least one vehicle sensing device embedded in a roadway yet slightly protruding above the road surface;
    a plurality of actuator buttons embedded in the roadway yet slightly protruding above the road surface;
    at least one grill embedded in the roadway in coplanar alignment with the surface of the road, including a plurality of actuator arms positioned in coplanar alignment with the surface of the road;

a plurality of cocking arms connected to the actuator buttons with locking flaps and cocking arm extensions, said cocking arm extensions including springs at ends opposite the respective actuator buttons, said cocking arm extensions; terminating below the grill and in direct alignment with the actuators arms;

an actuator shaft placed perpendicular to said actuator arms including a ratchet device for each actuator arm in the grill, said shaft connected to each actuator arm and forced to rotate by said ratchet device;

a turbine shaft;

a power transferring means for transferring the rotation of the actuator shaft to said turbine shaft, a generator motor connected to the turbine shaft;

a flywheel connected to the turbine shaft;

a regulating means connected to the turbine shaft for regulating the rotational velocities of the turbine shaft;

a speed brake connected to the turbine shaft, a battery connected to the generator motor; and a power conversion means connected to the generator and battery for connecting the generating system to an electrical device or to the power grid.

2. An apparatus according to claim 1 wherein said vehicle sensing means includes at least one vehicle sensor placed transversely across the roadway, relays connected from the vehicle sensor at road level to the locking flaps on the cocking arms.

3. An apparatus according to claim 1 wherein said vehicle sensing device embedded in the roadway distinguishes vehicular direction and is connected through relays to the locking flaps on the cocking arms.

4. An apparatus according to claim 1 wherein the actuator buttons are connected to the cocking arms.

5. An apparatus according to claim 1 wherein the cocking arms pivot against the cocking arm extensions, such that activation of the locking flaps is necessary in order for movement of the cocking arm extensions to raise the actuator arms extension's movement.

6. An apparatus according to claim 1 wherein the springs on the end of the cocking arm extensions have sufficient tension to push the actuator arms up without recoiling, yet recoil when a vehicle's wheel keeps the actuator arms from rising.

7. An apparatus according to claim 1 wherein a locking flap hinged at one end of a cocking arm remains unlocked thus preventing transfer of energy to the cocking arm extension, unless the vehicle sensing device has been activated.

8. An apparatus according to claim 7 wherein a cocking arm when locked by a locking flap and forced to move when an actuator button is depressed, causes a cocking arm extersion to pivot up, pushing an actuator arm through the grill.

9. An apparatus according to claim 1 wherein the grill embedded in a roadway is substantially coplanar with the surface of the roadway and constructed of suitable materials to bear the weight of cars and trucks that pass over it.

10. An apparatus according to claim 1 wherein the actuator arms in the horizontal position are substantially in coplanar alignment with the grill, do not leave space exposed at each end of the arm against the grill, or below an arm when an arm is raised, to permit debris to find its way into the grill.

11. An apparatus according to claim 1 wherein the power transferring means for transferring rotational energy from the actuator shaft to the turbine shaft includes reduction gears to efficiently transfer energy from the moving vehicle.

12. An apparatus according to claim 1 wherein the regulating means attached to the turbine shaft uses a clutch and torque converter actuated by sensors to regulate the speed of the output shaft.

13. An apparatus according to claim 1 wherein the speed brake regulates the rotational speed of the turbine shaft when rotation speed exceeds the optimal speed of the generator motor.

14. An apparatus according to claim 1 wherein the system for converting vehicular movement to rotational energy to electrical energy includes a power generator situated away from the lanes of traffic and placed underground or at the side of the road out of the way of traffic flow.

15. An apparatus according to claim 14 wherein said power generator produces direct current or alternating current by means of a power converter.

* * * * *